(12) United States Patent
Hirai et al.

(10) Patent No.: US 11,584,446 B2
(45) Date of Patent: Feb. 21, 2023

(54) FRONT VEHICLE-BODY STRUCTURE FOR VEHICLE

(71) Applicant: MAZDA MOTOR CORPORATION, Hiroshima (JP)

(72) Inventors: Shunsuke Hirai, Aki-gun (JP); Hiroaki Ishizu, Aki-gun (JP); Hidekazu Shiraishi, Aki-gun (JP); Kyohei Hirata, Aki-gun (JP); Kazuki Yamauchi, Aki-gun (JP); Takumi Fukuda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 105 days.

(21) Appl. No.: 17/191,421

(22) Filed: Mar. 3, 2021

(65) Prior Publication Data

US 2021/0309303 A1     Oct. 7, 2021

(30) Foreign Application Priority Data

Apr. 1, 2020   (JP) .............................. JP2020-065779

(51) Int. Cl.
*B62D 25/08*     (2006.01)
*B62D 25/14*     (2006.01)

(52) U.S. Cl.
CPC ......... *B62D 25/081* (2013.01); *B62D 25/088* (2013.01); *B62D 25/14* (2013.01)

(58) Field of Classification Search
CPC ..... B62D 25/081; B62D 25/088; B62D 25/08
USPC ....................................... 296/192, 96.21, 30
See application file for complete search history.

(56) References Cited

U.S. PATENT DOCUMENTS

| | | | |
|---|---|---|---|
| 2005/0067858 A1* | 3/2005 | Suh ...................... | B62D 25/088 296/192 |
| 2008/0116721 A1* | 5/2008 | Shimura .............. | B62D 25/081 296/192 |
| 2016/0362142 A1* | 12/2016 | Muneyasu ........... | B62D 25/081 |
| 2017/0158247 A1* | 6/2017 | Hwang ................ | B62D 27/023 |
| 2018/0118276 A1* | 5/2018 | Kuchibhatla ........ | B62D 25/081 |
| 2019/0300055 A1* | 10/2019 | Yamauchi ............ | B62D 21/152 |

(Continued)

FOREIGN PATENT DOCUMENTS

| | | | | |
|---|---|---|---|---|
| DE | 102012015334 A1 * | 3/2013 | ........... | B62D 25/088 |
| DE | 112016004830 T5 * | 7/2018 | ............. | B62D 25/08 |

(Continued)

*Primary Examiner* — D Glenn Dayoan
*Assistant Examiner* — Kevin P Weldon
(74) *Attorney, Agent, or Firm* — Studebaker & Brackett PC

(57) ABSTRACT

A front vehicle-body structure which reduces third-order vibration of a windshield, and improves NVH performance in a vehicle cabin. A front windshield fixed to an edge portion of an opening formed in a vehicle body, a pair of left and right front suspension housings, a cowl forming a lower edge of the opening for the front windshield, and a tower bar coupling each of the left and right front suspension housings with a region around a vehicle-width-direction center portion of the cowl are provided. Node members, each of which locally improves bending rigidity of the cowl, are disposed in two positions in the cowl that divide a bonding surface to a windshield lower edge into generally three equal parts in the vehicle width direction, and the tower bar is fixed between respective positions of the two node members in the cowl.

6 Claims, 10 Drawing Sheets

(56) References Cited

U.S. PATENT DOCUMENTS

2021/0229751 A1* 7/2021 Wakabayashi ......... B62D 21/15
2021/0253177 A1* 8/2021 Yamauchi ............ B62D 25/085

FOREIGN PATENT DOCUMENTS

| JP | 2006137327 A | * | 6/2006 |
| JP | 2010-247743 A | | 11/2010 |

* cited by examiner

FRONT VEHICLE-BODY STRUCTURE FOR VEHICLE

TECHNICAL FIELD

This disclosure relates to a front vehicle-body structure for a vehicle, the front vehicle-body structure including, for example, a front windshield fixed to an edge portion of an opening formed in a vehicle body, a pair of left and right front suspension housings, a cowl forming a lower edge of the opening for the front windshield, and a tower bar coupling each of the left and right front suspension housings with a vehicle-width-direction center portion of the cowl.

BACKGROUND ART

As a front vehicle-body structure for a vehicle, a structure has been known which includes a so-called tower bar coupling upper portions of left and right suspension towers together or coupling the suspension towers with a cowl for an improvement in traveling performance of the vehicle.

As an example of the latter, Japanese Patent Laid-Open No. 2010-247743 discloses a vehicle-body front structure in which a center portion of a tower bar in a vehicle width direction is mounted on a center portion of a cowl (dashboard upper portion) in the vehicle width direction.

In addition, Japanese Patent Laid-Open No. 2010-247743 discloses a configuration which includes a box-shaped reinforcement member in the center portion of the cowl in the vehicle width direction in order to enhance rigidity of a portion around a mounting portion of the tower bar on this cowl.

Incidentally, the present inventors have found that vibration (130 to 140 Hz) of an engine of a vehicle causes vibration in a waveform in which two positions serve as nodes, the two positions dividing a windshield into generally three equal parts in the vehicle width direction, and regions serve as antinodes, the regions resulting from division into the three equal parts (hereinafter, such vibration will also be referred to as "third-order vibration") and respective amplitudes of those three antinodes are imbalanced (not canceled). In particular, a phenomenon occurs in which the region at a center in the vehicle width direction has a small amplitude compared to the regions on lateral sides in the vehicle width direction.

Then, the present inventors have focused on the fact that in order to improve NVH (noise, vibration, and harshness) performance in a vehicle cabin, it is effective to reduce the above-described imbalance third-order vibration of the windshield due to vibration of the engine of the vehicle.

However, in above Japanese Patent Laid-Open No. 2010-247743, mounting rigidity of the tower bar on the cowl is enhanced as described above, and such an approach is expected to perform reduction itself in the amplitudes of the antinodes of the third-order vibration but is considered to be inadequate for resolution of imbalance among the respective amplitudes of the three antinodes.

SUMMARY

The present disclosure has been made in consideration of the above, and aims to provide a front vehicle-body structure for a vehicle that can reduce third-order vibration of a windshield and improve NVH performance in a vehicle cabin (for example, causing an occupant to be less likely to sense muffled sound).

This disclosure provides a front vehicle-body structure including a front windshield fixed to an edge portion of an opening formed in a vehicle body; a pair of left and right front suspension housings; a cowl forming a lower edge of the opening for the front windshield; and a tower bar coupling each of the left and right front suspension housings with a region around a vehicle-width-direction center portion of the cowl, in which rigidity improvement members each of which locally improves rigidity of the cowl are disposed in two positions in the cowl. The two positions divide a bonding surface to a lower edge of the front windshield into generally three equal parts in a vehicle width direction, and the tower bar is fixed to positions corresponding to portions between respective positions of the two rigidity improvement members in the vehicle width direction of the cowl.

In the above configuration, because vibration in vehicle traveling is input to a position in the vehicle width direction of the cowl, the position being close to a central antinode of third-order vibration occurring to the windshield, via the tower bar, even in a case where imbalance third-order vibration (for example, third-order vibration in which an amplitude of the central antinode is smaller than antinodes on both sides) occurs to the windshield, amplitude differences among the antinodes of the third-order vibration can be made small.

In addition, nodes of third-order vibration can be adjusted to positions of nodes of balanced third-order vibration by the rigidity improvement members.

Accordingly, balance of third-order vibration can be adjusted, and as a result, NVH performance in a vehicle cabin can be improved.

As an aspect of this disclosure, the cowl has a closed cross-section or an open cross-section extending in the vehicle width direction, and the rigidity improvement member is a node member locally provided in the closed cross-section or the open cross-section in the vehicle width direction.

In the above configuration, the rigidity improvement member can be formed with a simple configuration obtained by providing the node member.

As an aspect of this disclosure, closed cross-sectional members forming closed cross-sections extending in a vehicle up-down direction between the closed cross-sectional members and a dash panel extending downward from a lower portion of the cowl are provided below the cowl, and the closed cross-sectional members are provided in positions corresponding to the two positions in the vehicle width direction below the cowl.

In the above configuration, the closed cross-sectional members are provided in the positions corresponding to the two positions in the vehicle width direction below the cowl, that is, in the positions corresponding to the positions of nodes of balanced third-order vibration desirably occurring to the windshield, and thereby the nodes of third-order vibration of the windshield can more certainly be produced in aimed positions.

As an aspect of this disclosure, the two positions dividing the bonding surface into generally three equal parts in the vehicle width direction are set in a range, with respect to a middle position of the bonding surface in the vehicle width direction, between a vehicle-width-direction outer side of a position corresponding to 10% of a length of the bonding surface in the vehicle width direction and a vehicle-width-direction inner side of a position corresponding to 25% of the length of the bonding surface in the vehicle width direction.

In the above configuration, the two positions dividing the bonding surface into generally three equal parts in the vehicle width direction are caused to fall in a range between the vehicle-width-direction outer side of the position of a node of fifth-order vibration (the position corresponding to 10% of the length of the bonding surface in the vehicle width direction from the middle position of the bonding surface in the vehicle width direction) and the vehicle-width-direction inner side of the position of a node of fourth-order vibration (the position corresponding to 25% of the length of the bonding surface in the vehicle width direction from the middle position of the bonding surface in the vehicle width direction), and as described above, the nodes of third-order vibration can thereby be adjusted to the positions of nodes of balanced third-order vibration by the rigidity improvement members.

The above configuration can reduce third-order vibration of a windshield and improve NVH performance in a vehicle cabin.

DETAILED DESCRIPTION

Figure 1:
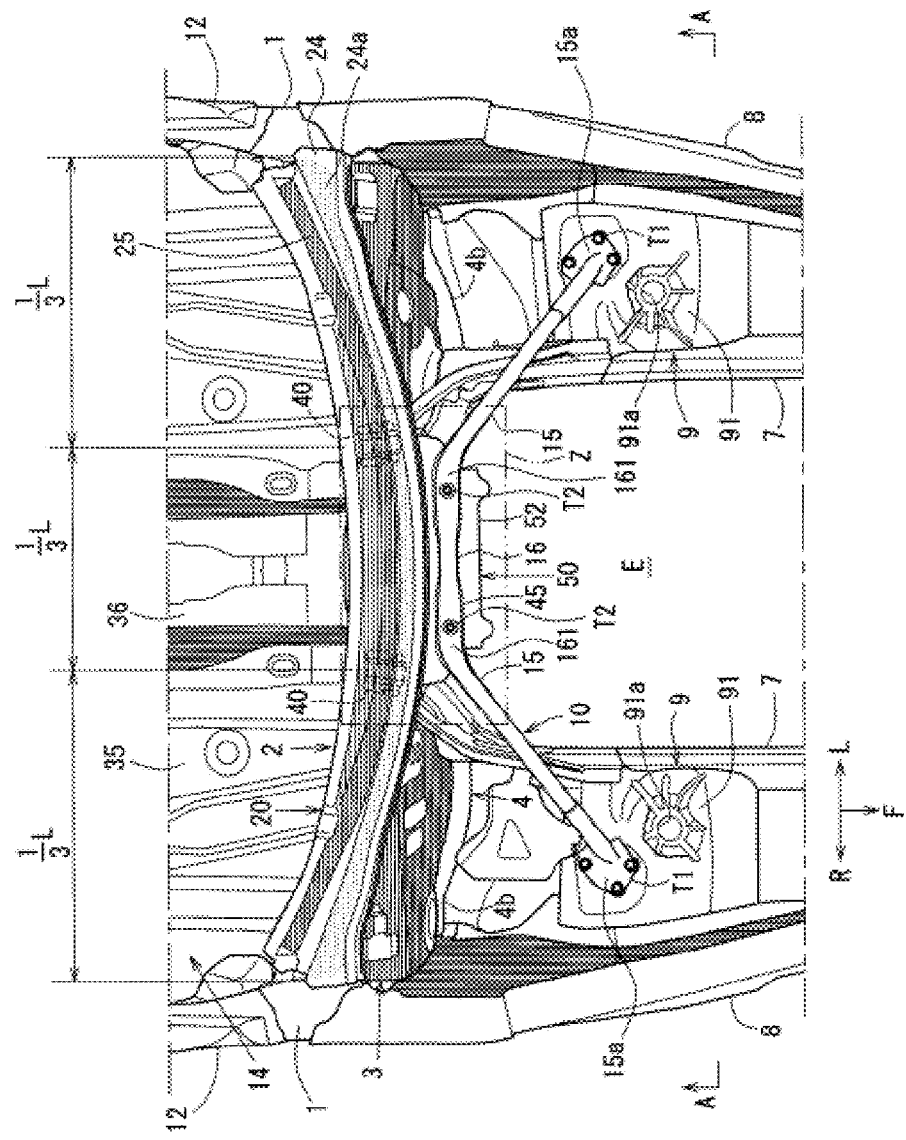
FIG. 1 is a plan view illustrating principal components of a front vehicle-body structure for a vehicle of this embodiment.
Figure 2:
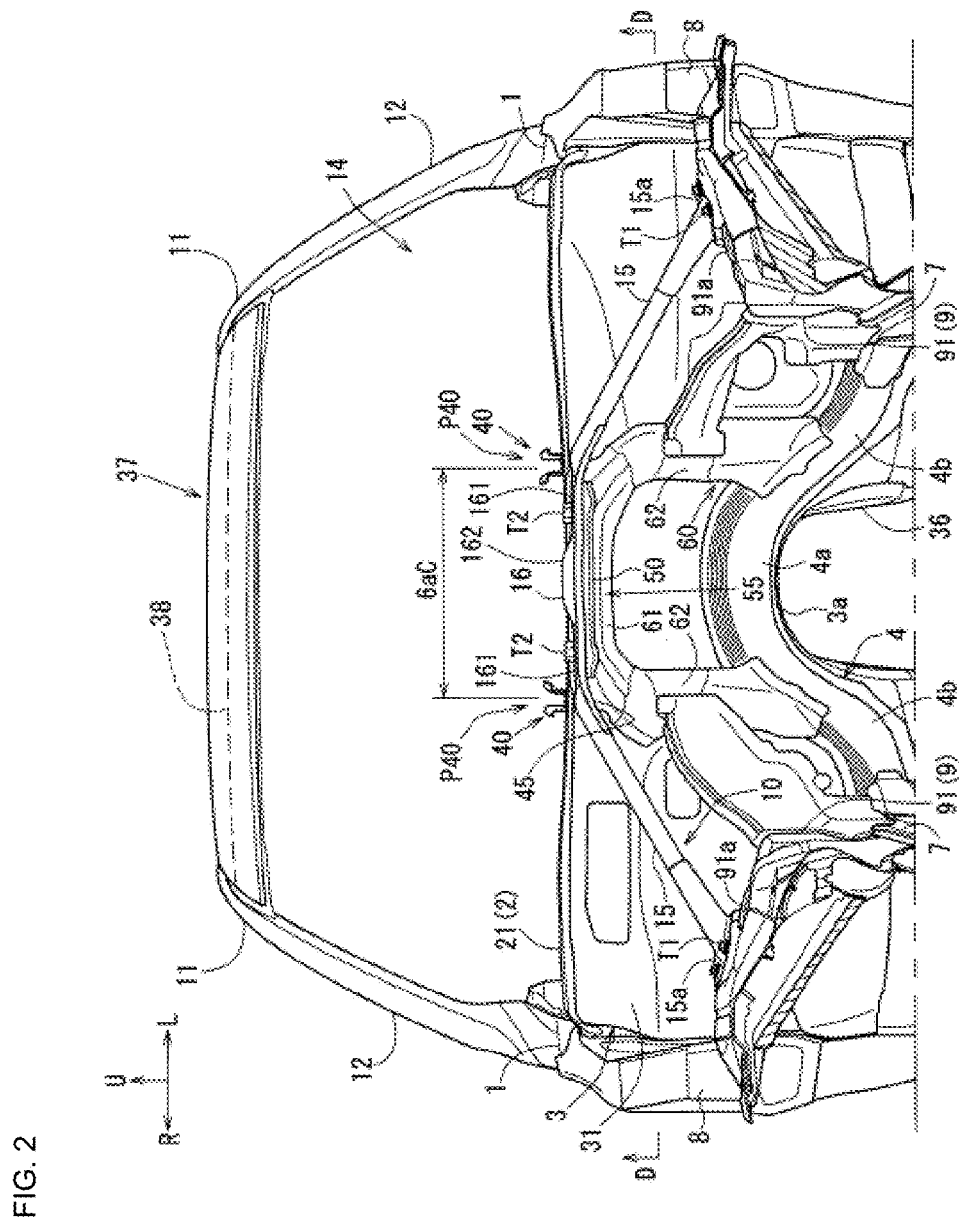
FIG. 2 is an arrow cross-sectional view taken along A-A in FIG. 1.
Figure 3:
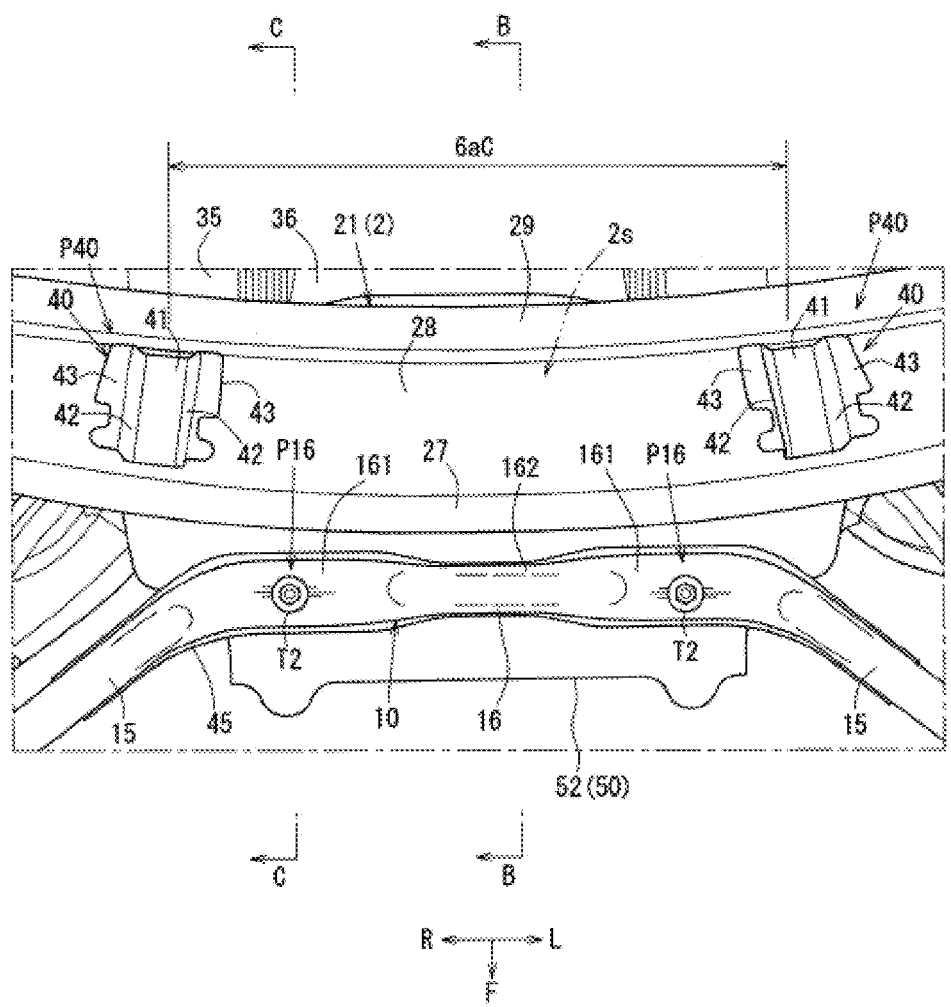
FIG. 3 is an enlarged view of a region Z of FIG. 1, the enlarged view being illustrated by removing a cowl panel upper portion.

An embodiment of the present disclosure will hereinafter be described based on drawings. In the drawings, an arrow F indicates a vehicle front area, an arrow U indicates a vehicle upper area, an arrow R indicates a vehicle right area, and an arrow L indicates a vehicle left area. In FIG. 1 and FIG. 2, a bonnet 5 and a front windshield 6 are not illustrated, and FIG. 2 and FIG. 3 illustrate a state where a cowl upper panel 20 is removed.

As illustrated in FIG. 1 and FIG. 2, a front vehicle-body structure for a vehicle of this embodiment includes left and right hinge pillars 1, a cowl 2, a dash panel 3, a dash cross member 4, the bonnet 5 (see FIG. 5), the front windshield 6 (see FIG. 5), left and right front side frames 7 (see FIG. 1), left and right apron reinforcements 8 (hereinafter abbreviated as "apron-rein 8"), left and right front suspension towers 9 (hereinafter abbreviated as "sus-tower 9"), and a tower bar 10.

The left and right hinge pillars 1 are provided at an interval corresponding to a generally whole width of a vehicle body and each extend in a vehicle up-down direction. Note that front pillars 12 are provided which extend to a rear and upper area of the vehicle and from upper ends of the hinge pillars 1 to roof side rails 11.

The cowl (also referred to as "cowl box") 2 extends in the vehicle width direction between upper end portions of the left and right hinge pillars 1 and is formed into, in a planar view, a general arc shape (arch shape) having a general center in the vehicle width direction protruding to the vehicle front area (see FIG. 1).

Figure 5:
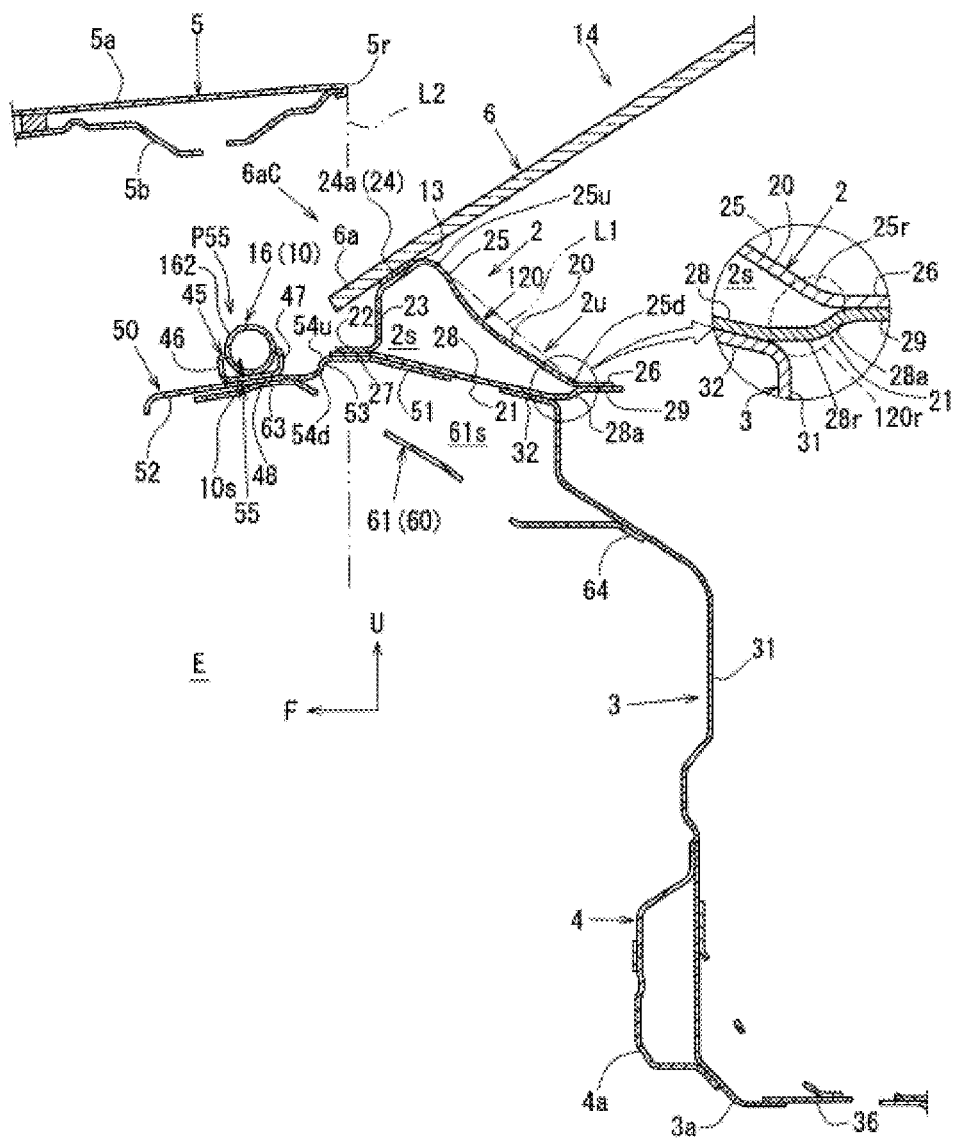
FIG. 5 is an arrow cross-sectional view taken along line B-B in FIG. 3.

As illustrated in FIG. 1 and FIG. 5, the cowl 2 has a length in the vehicle width direction which is slightly longer on both sides than a length of a lower edge 6a of the front windshield 6 (see FIG. 5), the lower edge 6a extending in the vehicle width direction (hereinafter abbreviated as "windshield lower edge 6a"). As illustrated in FIG. 5, the windshield lower edge 6a is bonded to the cowl 2 via a window rubber 13. This bonding surface 24a (bonding region) is formed throughout a generally whole width of the windshield lower edge 6a in the vehicle width direction. Note that the dotted region in a first surface portion 24 of the cowl 2 in FIG. 1, the first surface portion 24 being described later, indicates the bonding surface 24a.

Figure 4:
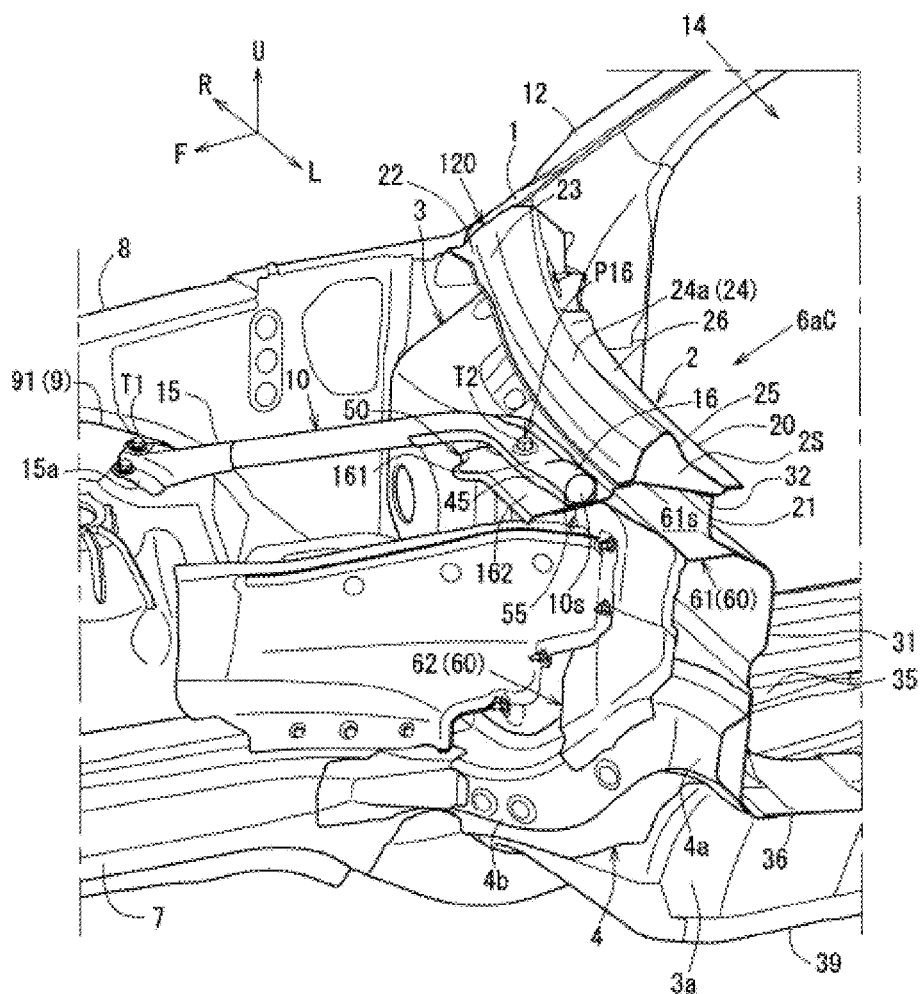
FIG. 4 is a perspective cross-sectional view of a cut end portion along line B-B in FIG. 3 as seen from a left and front area of the vehicle.

Furthermore, as illustrated in FIG. 4 and FIG. 5, the cowl 2 includes the cowl upper panel 20 and a cowl lower panel 21, and a closed cross-section portion 120 is formed in which a closed cross-sectional space 2s extending in the vehicle width direction is formed.

As illustrated in FIG. 1, FIG. 2, FIG. 4, and FIG. 5, the dash panel 3 is disposed in a vertical wall shape so as to extend in the width direction and up-down direction of the vehicle between the left and right hinge pillars 1 and so as to partition an engine room E from a vehicle cabin in a vehicle front-rear direction, and a lower portion of the dash panel 3 extends while being inclined rearward toward a lower area (see FIG. 4 and FIG. 5).

Note that as illustrated in FIG. 1 and FIG. 4, a floor panel 35 forming a bottom surface of the vehicle cabin is joined to a lower portion back end of the dash panel 3. This floor panel 35 extends generally horizontally in the width direction and front-rear direction of the vehicle, and in a vehicle-width-direction center portion, a floor tunnel 36 protruding into the vehicle cabin (upward) and extending in the vehicle front-rear direction is integrally or substantially integrally formed.

As illustrated in FIG. 4 and FIG. 5, the dash panel 3 includes a dash panel body 31 disposed below the cowl 2 and extending in the vehicle up-down direction in a vertical wall shape and an upper end flange portion 32 extending from an upper end of the dash panel body 31 to the vehicle front area, and the upper end flange portion 32 is joined, from a lower area, to a bottom surface portion 28 of the cowl lower panel 21 of the cowl 2.

In addition, as illustrated in FIG. 2 and FIG. 4, a lower end edge of the dash panel 3 in the vicinity of a general center in the vehicle width direction is formed into, in a front view, a shape protruding to the vehicle upper area in a generally inverted U shape along the floor tunnel 36 extending in the vehicle cabin in the vehicle front-rear direction. This lower end edge formed into the shape along the floor tunnel 36 will be denoted as a tunnel corresponding portion 3a.

Further, as illustrated in FIG. 2, FIG. 4, and FIG. 5, the dash cross member 4 couples lower portions of the left and right hinge pillars 1 together in the vehicle width direction along a lower end edge of a front face of the dash panel body 31. Although not illustrated in detail, this dash cross member 4 is formed to have a generally hat-shaped cross-section protruding to the vehicle front area so as to form a closed cross-section with the dash panel 3 in a vertical cross-section along the up-down direction and front-rear direction of the vehicle.

More specifically, as illustrated in FIG. 2 and FIG. 4, in a front view, the dash cross member 4 is integrally formed with a gate-shaped portion 4a in a general gate shape in a front view, the general gate shape protruding to the vehicle upper area along the tunnel corresponding portion 3a of the dash panel 3, and horizontally extended portions 4b respectively extending to vehicle-width-direction outer sides from a lower end of the gate-shaped portion 4a toward the left and right hinge pillars 1.

Note that as illustrated in FIG. 4, back ends of the front side frames 7 respectively corresponding to the left and right horizontally extended portions 4b and being described later are joined to intermediate portions of the horizontally extended portions 4b in the vehicle width direction, the horizontally extended portions 4b being provided on both sides of the dash cross member 4 (however, FIG. 4 illustrates only a joined portion between the front side frame 7 on a vehicle right side and the dash cross member 4).

As illustrated in FIG. 5, the bonnet (also referred to as "bonnet hood") 5 covers an upper portion of the engine room E while being capable of opening and closing and includes a bonnet outer panel 5a forming an outer surface of the bonnet 5 and a bonnet inner panel 5b forming a surface on the engine room E side. The bonnet outer panel 5a is attached to the bonnet inner panel 5b by a hemming process for caulking an outer periphery of the bonnet inner panel 5b by a folded outer periphery.

Both sides, in the vehicle width direction, of a back end of the bonnet 5 are fixed to the vehicle body via bonnet hinges not illustrated, and the bonnet 5 is supported by the vehicle body by those bonnet hinges while being capable of opening and closing about back end portions as pivots.

The front windshield 6 is so-called front window glass, is disposed to cover an opening 14 (see FIG. 1 and FIG. 2) formed in the vehicle body for disposing a front window, and extends to an upper and rear area of the vehicle in a rear area of the bonnet 5 while being inclined as illustrated in FIG. 5. Note that the front windshield 6 is not limited to glass but may be formed of a transparent reinforced plastic.

The front windshield 6 is fixed to an edge portion of the opening 14 for disposing the front window. Specifically, an upper edge of the front windshield 6 is supported by a front header 38 (see FIG. 2) forming an upper edge of the opening 14 for disposing the front window. Note that the front header 38 is a vehicle-body framework member extending in the vehicle width direction along a front edge of a roof portion 37. In addition, left and right side edges of the front windshield 6 are supported by the front pillars 12 forming side edges respectively corresponding to left and right sides of the opening 14 for disposing the front window, and the lower edge 6a of the windshield 6 is supported by the cowl 2 forming a lower side edge of the opening 14 for disposing the front window as described above.

Further, as illustrated in FIG. 1 and FIG. 4, the front side frames 7 extend in the vehicle front-rear direction on both of left and right sides of the engine room E.

Although not illustrated, a configuration is made such that a crash can is mounted on front ends of the front side frames 7 via a setting plate.

As illustrated in FIG. 4, the back ends of the front side frames 7 are joined to the lower portion of the dash panel 3, and its rear portion is joined to floor side frames 39 extending in the vehicle front-rear direction in a lower portion of the floor panel 35.

As illustrated in FIG. 1, FIG. 2, and FIG. 4, the apron-reins 8 extend in the vehicle front-rear direction on the vehicle-width-direction outer sides and in the vehicle upper area of the front side frames 7, and back ends are joined to upper ends of the hinge pillars 1 respectively corresponding to the left and right apron-reins 8.

Further, each of the above-described hinge pillar 1, front side frame 7, and apron-rein 8 is provided as a vehicle-body framework member such that a cross-section orthogonal to an extending direction has a closed cross-section shape.

The sus-tower 9 is provided between respective rear portions of the front side frame 7 and the apron-rein 8. An upper portion of the sus-tower 9 is composed of a front suspension housing 91 as a sus-tower upper panel. The front suspension housing 91 is joined to the front side frame 7 and the apron-rein 8 across their rear portions. In addition, in the front suspension housing 91, a damper mounting portion 91a in a generally circular shape in a planar view is formed on which an upper end of a front suspension damper (not illustrated) is mounted (see FIG. 1 and FIG. 2).

Further, as illustrated in FIG. 1 to FIG. 5, the tower bar 10 extends in the vehicle width direction between the left and right sus-towers 9 so as to couple those together. The tower bar 10 extends in the vehicle width direction such that a center portion in the vehicle width direction makes circumvention to a side of a center portion of the cowl 2 in the vehicle width direction (the vehicle rear area). Further, the center portion of the tower bar 10 in the vehicle width direction is coupled with the center portion of the cowl 2 in the vehicle width direction via a bracket 50 described later.

That is, because as described above, the cowl 2 has a closed cross-section structure having the closed cross-sectional space 2s extending in the vehicle width direction in the internal portion (see FIG. 4 and FIG. 5), the tower bar 10 is not directly joined to the cowl 2 but is joined, as described above, via the bracket 50 in a region around a front area of the vehicle-width-direction center portion (6aC) of the cowl 2 (see FIG. 3 and FIG. 4).

The tower bar 10 includes a pair of left and right bar vehicle-width outer side portions 15 and a bar vehicle-width center portion 16, is formed into a cylindrical shape (pipe shape) throughout generally the whole tower bar 10 in an extending direction (the whole thereof except flanges 15a on left and right sides and fastening portions 161 which will be described later), and is integrally formed with a single member continuously extending in the vehicle width direction (longitudinal direction). Note that the tower bar 10 is generally horizontally disposed.

The pair of left and right bar vehicle-width outer side portions 15 generally linearly extend from the front suspension housings 91 of the sus-towers 9 to the vehicle rear area and to a center in the vehicle width direction, the sus-towers 9 respectively corresponding to the left and right bar vehicle-width outer side portions 15.

As illustrated in FIG. 3, the bar vehicle-width center portion 16 generally linearly extends in the vehicle width direction in parallel with the center portion (6aC) in a region around a front area of the center portion (6aC) of the cowl 2 in the vehicle width direction so as to couple back ends of the left and right bar vehicle-width outer side portions 15 together.

As illustrated in FIG. 1, FIG. 2, and FIG. 4, the tower bar 10 is mounted on and fixed to the front suspension housings 91 of the left and right sus-towers 9 by fastening members T1 (bolts and nuts). Specifically, the flanges 15a for mounting the sus-towers 9 are respectively integrally formed at outer ends (front ends), in the vehicle width direction, of the pair of left and right bar vehicle-width outer side portions 15 in the tower bar 10. Further, the flanges 15a on the left and right sides are fastened to rear vicinity positions of the damper mounting portions 91a in the front suspension housing 91 respectively corresponding to the left and right flanges 15a by the fastening members T1.

Figure 6:
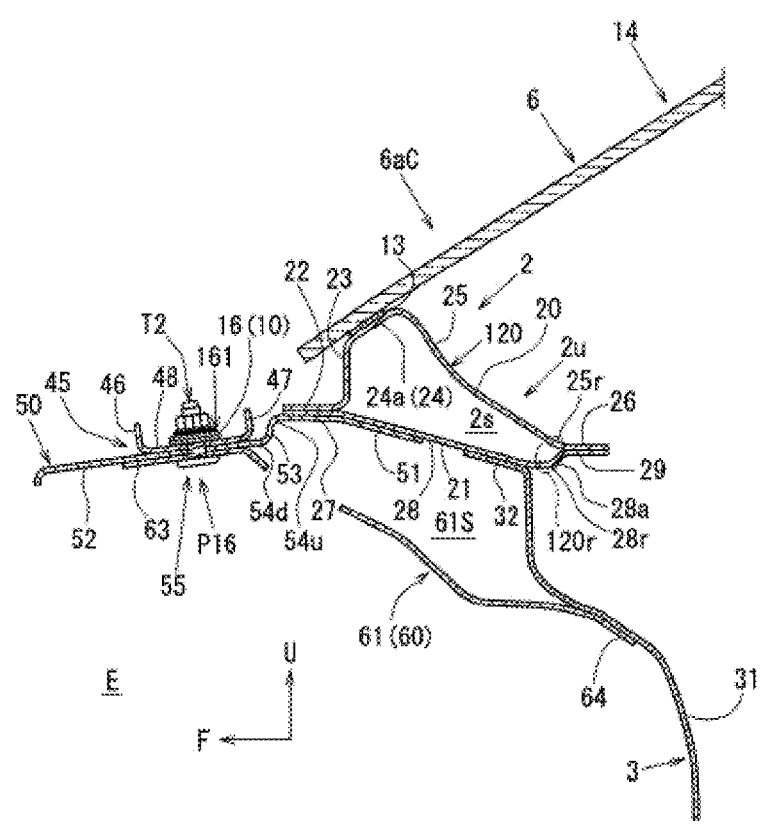
FIG. 6 is an arrow cross-sectional view taken along line C-C in FIG. 3.

Further, as illustrated in FIG. 4 to FIG. 6, the cowl upper panel 20 of the cowl 2 is formed to have an open cross-section shape in which an orthogonal cross-section to the vehicle width direction opens downward. Specifically, the cowl upper panel 20 is integrally formed while having a front-side flange 22 generally horizontally extending in the vehicle front-rear direction, a front face 23 rising from a back end of the front-side flange 22 to the vehicle upper area, a first surface portion 24 further extending generally linearly from an upper end of the front face 23 to the vehicle upper area and to the vehicle rear area while being inclined, a second surface portion 25 extending from a back end of the first surface portion 24 to a rear and lower area of the vehicle while being inclined, and a rear-side flange 26 generally horizontally extending from a back end of the second surface portion 25 to the vehicle rear area.

That is, a top face 2U of the cowl 2 is formed with the first surface portion 24 and the second surface portion 25. As illustrated in FIG. 5, a corner portion of the first surface portion 24 and the second surface portion 25 is formed in a curved shape directed upward in an orthogonal cross-sectional view to the vehicle width direction.

The first surface portion 24 is formed to have the inclination angle corresponding to an inclination angle of the front windshield 6 and is formed while having the above bonding surface 24a bonding the windshield lower edge 6a as described above.

The second surface portion 25 extends to a rear and lower area of the vehicle while being inclined throughout a whole length in the vehicle front-rear direction to the extent that a back end of the second surface portion 25 is positioned below a height of the front-side flange 22 and in the rear of a position of the dash panel body 31 in a vertical wall shape.

An inclination angle of the second surface portion 25 is inclined downward toward the vehicle rear area throughout its whole length in the vehicle front-rear direction and is set to an inclination angle along an angle at which the head of a pedestrian moves from a front and upper area to the cowl 2 in collision.

In short, the cowl 2 is not formed to be easily crushed by having a breakage trigger or the like for collision but, as for a rear portion (the second surface portion 25), is formed to be inclined downward toward a rear area of the vehicle so as to avoid (parry) a colliding object. In addition, a front portion of the cowl 2 is formed to have a layout not hindering downward plastic deformation of the bonnet 5. Thus, the cowl 2 of this embodiment can maintain pedestrian protection performance in addition to securing rigidity of the cowl 2 itself. Note that in this embodiment, the second surface portion 25 is formed such that a front side portion is inclined downward toward a rear area of the vehicle with a steeper slope than a rear side portion (see FIG. 5).

Here, as illustrated in an enlarged portion of principal components in FIG. 5, an extending portion, in the second surface portion 25, extending to the rear of an upper end (a back end of the upper end flange portion 32) of the dash panel body 31 will hereinafter be referred to as "rear extending portion 25r".

Further, as illustrated in FIG. 5, the second surface portion 25 is formed such that an imaginary straight line L1 connecting a lower end 25d with an upper end 25u intersects (is generally orthogonal in this example) with the front windshield 6 inclined in a front-low rear-high shape in an orthogonal cross-sectional view to the vehicle width direction. Accordingly, the second surface portion 25 is configured to effectively receive and inhibit vibration of the front windshield 6.

As illustrated in FIG. 5 and FIG. 6, the cowl lower panel 21 is formed into a generally flat-plate shape so as to close a downward opening of the cowl upper panel 20. Specifically, the cowl lower panel 21 is integrally formed with a front-side flange 27 generally horizontally extending in the vehicle front-rear direction, the bottom surface portion 28 extending from a back end of the front-side flange 27 to a rear and lower area of the vehicle while being inclined, and a rear-side flange 29 generally horizontally extending from a back end of the bottom surface portion 28 to the vehicle rear area.

The bottom surface portion 28 is inclined downward toward the vehicle rear area throughout a whole length in the vehicle front-rear direction similarly to the second surface portion 25 but is inclined with a milder slope than the second surface portion 25, and as illustrated in the enlarged portion of principal components in FIG. 5, the back end is positioned in the rear of the upper end of the dash panel body 31 in a vertical wall shape.

As illustrated in the enlarged portion of principal components in FIG. 5, in an extending portion 28r, in the bottom surface portion 28, extending to the rear of the dash panel body 31 (hereinafter referred to as "rear extending portion 28r"), a rising portion 28a is formed which rises toward the rear-side flange 26 of the cowl upper panel 20.

In the cowl 2, the front-side flanges 22 and 27 and the respective rear-side flanges 26 and 29 in the cowl upper panel 20 and the cowl lower panel 21 are joined together by welding, and the closed cross-section portion 120 is formed as described above. That is, the closed cross-section portion 120 of the cowl 2 is formed with the front face 23, the first surface portion 24, and the second surface portion 25 in the cowl upper panel 20 and the bottom surface portion 28 in the cowl lower panel 21.

In the vehicle rear area of the upper end of the dash panel body 31 in a vertical wall shape in the closed cross-section portion 120 of the cowl 2, a bulge 120r bulging from the dash panel body 31 to the vehicle rear area is formed with the rear extending portion 25r of the second surface portion 25 and the rear extending portion 28r of the bottom surface portion 28. In other words, the bulge 120r is formed in the vehicle rear area of a joined portion between the upper end flange portion 32 of the dash panel 3 and the bottom surface portion 28 of the cowl 2.

As described above, the closed cross-section portion 120 of the cowl 2 is formed to have the bulge 120r in a rear portion and thereby secures an area of an orthogonal cross-section to the vehicle width direction as much as possible compared to a case where the bulge 120r is not provided.

Further, the rear portion of the closed cross-section portion 120 of the cowl 2, the rear portion including the bulge 120r, is formed into a tapered shape so as to gradually bulge to a rear and lower area of the vehicle toward the vehicle rear area.

In addition, as illustrated in the enlarged portion of principal components in FIG. 5, the above-described rising portion 28a formed in a rear portion of the bottom surface portion 28 of the cowl lower panel 21 is positioned in a lower portion of the bulge 120r. The rear portion of the closed cross-section portion 120 of the cowl 2 has the tapered shape in the vehicle up-down direction toward the vehicle rear area as described above; however, the above-described rising portion 28a is formed, and a length, in the vehicle up-down direction, of the bulge 120r positioned around a back end of the closed cross-section portion 120 of the cowl 2 is thereby secured.

Further, as indicated by an imaginary straight line L2 in FIG. 5, a front end of the closed cross-section portion 120 of the cowl 2, that is, the front face 23 is positioned slightly in the rear of the back end of the bonnet 5 so as not to hinder downward plastic deformation of the bonnet 5 when a colliding object to a rear portion of the bonnet 5 (for example, the head of a pedestrian) collides from an upper area. Note that the imaginary straight line L2 is a straight line extending in parallel with the vehicle up-down direction.

Further, in this embodiment, the front face 23 of the closed cross-section portion 120 extends generally in parallel with the vehicle up-down direction. Accordingly, the cowl 2 secures the area of the orthogonal cross-section of the closed cross-section portion 120 to the vehicle width direction as much as possible in the vehicle up-down direction while avoiding interference with the closed cross-section portion 120 in the downward plastic deformation of the bonnet 5.

Note that in this embodiment, the cowl 2 is positioned below a back end 5r of the bonnet 5, and the windshield lower edge 6a supported by the bonding surface 24a of the first surface portion 24 of the cowl 2 is also positioned below the back end 5r of the bonnet 5.

Further, as illustrated in FIG. 1 to FIG. 3, in the front vehicle-body structure of this embodiment, node members 40 as rigidity improvement members each of which locally improves rigidity of the cowl 2 are disposed in two positions, in the cowl 2, dividing the bonding surface 24a to the windshield lower edge 6a into generally three equal parts in the vehicle width direction.

In other words, as illustrated in FIG. 1 and FIG. 3, the node members 40 are disposed in two positions corresponding to positions at approximately ⅓ of a length L (see FIG. 1), in an axis direction, of the bonding surface 24a to the windshield lower edge 6a in the cowl 2. As illustrated in FIG. 2 and FIG. 3, the above-described positions, in which the two node members 40 are disposed, in the vehicle width direction of the cowl 2 are each set to node disposing positions P40.

As illustrated in FIG. 3, the node member 40 is integrally formed, such that an orthogonal cross-section to the vehicle front-rear direction becomes a hat-shaped profile, with a bottom face 41 extending in the vehicle width direction, a pair of left and right side faces 42 extending from both ends of the bottom face 41 in the vehicle width direction to the vehicle upper area, and a pair of left and right upper end flange portions 43 respectively extending in opposite directions in the vehicle width direction from upper ends of the pair of left and right side faces 42.

Further, in the node member 40, the bottom face 41 is joined to the bottom surface portion 28 of the cowl lower panel 21 from an upper area, and the left and right upper end flange portions 43 are joined to the first surface portion 24 and the second surface portion 25 of the cowl upper panel 20 from a lower area.

Accordingly, the node members 40 are locally disposed in the node disposing positions P40 in the vehicle width direction of the cowl 2 and are disposed so as to part (close), in the vehicle width direction, the closed cross-sectional space 2s extending in the vehicle width direction of the cowl 2 in the above two node disposing positions P40 in the vehicle width direction of the cowl 2 (see FIG. 3).

Further, as illustrated in FIG. 2 to FIG. 7, in the front vehicle-body structure of this embodiment, the bracket 50 extending from the center portion (6aC) to the vehicle front area in a tongue shape is provided in the center portion (6aC) of the cowl 2 (windshield lower edge 6a) in the vehicle width direction.

Specifically, as illustrated in FIG. 5, the bracket 50 is integrally formed of a steel plate and with a flange portion 51 joined to the cowl 2 and a front extending portion 52 extending from a front end of the flange portion 51 to the vehicle front area. As illustrated in FIG. 3, across a middle position of the cowl 2 in the vehicle width direction, the bracket 50 has a length in the vehicle width direction, the length covering generally the whole center portion 6aC of the windshield lower edge 6a in the vehicle width direction and also covering both sides with respect to the middle position. Note that in this embodiment, the center portion 6aC of the windshield lower edge 6a (that is, the bonding surface 24a) in the vehicle width direction denotes a region corresponding to a center portion in a case where the bonding surface 24a in the cowl 2 to the windshield lower edge 6a is divided into generally three equal parts in the vehicle width direction (see FIG. 2 and FIG. 3).

Figure 7:
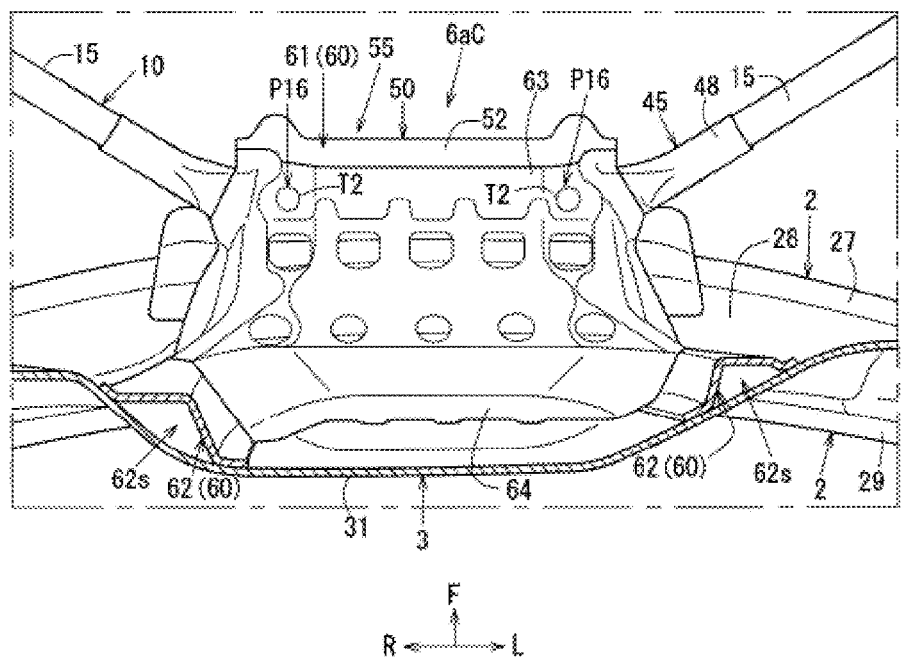
FIG. 7 is an arrow cross-sectional view taken along line D-D in FIG. 2.

Here, as illustrated in FIG. 4 to FIG. 6, the cowl 2 is provided to jut out to a front area with respect to the dash panel body 31. Thus, as illustrated in FIG. 5 to FIG. 7, in the bracket 50, the flange portion 51 is joined to a front side portion of the bottom surface portion 28 and the front-side flange 27 in the cowl 2 from a lower area by welding, in the center portion (6aC) of the cowl 2 in the vehicle width direction. Accordingly, the bracket 50 is mounted on the cowl 2 in a cantilever shape protruding forward such that the front extending portion 52 extends forward from the center portion (6aC) of the cowl 2 in the vehicle width direction.

As illustrated in FIG. 1 to FIG. 3, the tower bar 10 extends across the front extending portion 52 of the bracket 50 in the vehicle width direction such that the bar vehicle-width center portion 16 is positioned above the bracket 50. Further, as illustrated in FIG. 4 to FIG. 6, mounting of the bar vehicle-width center portion 16 of the tower bar 16 is supported by the front extending portion 52 of the bracket 50 from a lower area via a guide reinforcement member 45.

The guide reinforcement member 45 is formed along the extending direction of the tower bar 10 throughout the bar vehicle-width center portion 16 of the tower bar 10 and rear portions (vehicle-width-direction inner side portions) of the left and right bar vehicle-width outer side portions 15 (see FIG. 1 to FIG. 4 and FIG. 7).

The guide reinforcement member 45 is formed into a U shape opening upward such that the tower bar 10 having a cylindrical orthogonal cross-section to the extending direction is capable of being fitted therein. Specifically, as illustrated in FIG. 5 and FIG. 6, the guide reinforcement member 45 is integrally formed with a front face 46 guiding a fitted portion of the tower bar 10 into the guide reinforcement member 45 from a front side, a rear face 47 guiding the fitted portion from a rear side, and a bottom face 48 coupling lower ends of those front face 46 and rear face 47 together.

As illustrated in FIG. 3, FIG. 4, and FIG. 6, the bar vehicle-width center portion 16 of the tower bar 10 is fastened and fixed to the bracket 50 via the guide reinforcement member 45 in positions on both sides of the bracket 50 in the vehicle width direction, that is, in two positions separated in the vehicle width direction by fastening members T2 (bolts and nuts).

Positions, to which the bar vehicle-width center portion 16 is fastened, in the vehicle width direction of the bracket 50 are set to bar fastening positions P16.

As illustrated in FIG. 3, the left and right bar fastening positions P16 are positioned on vehicle-width-direction inner sides of the node disposing positions P40 respectively corresponding to the left and right bar fastening positions P16. That is, the bar vehicle-width center portion 16 of the tower bar 10 is fixed via the bracket 50 between the respective positions of the two node members 40 in the vehicle width direction of the cowl 2.

As illustrated in FIG. 3, FIG. 4, and FIG. 6, the fastening portions 161 to the bracket 50 in the extending direction of the bar vehicle-width center portion 16 are formed into flat shapes by performing compressive deformation in the vehicle up-down direction such that the cylindrical tower bar 10 locally has flat shapes (that is, collapsing a closed cross-sectional space 10*s* in an internal portion) and thereby enable fastening by the fastening members T2.

The bar vehicle-width center portion 16 of the tower bar 10 is disposed to extend in the vehicle width direction along the cowl 2 in a region around a front side of the vehicle-width-direction center portion (6*a*C) of the cowl 2. Note that in this embodiment, the bar vehicle-width center portion 16 has generally the same length in the vehicle width direction as the above-described center portion (6*a*C) of the cowl 2 in the vehicle width direction.

Further, as illustrated in FIG. 1 to FIG. 5, the other sections of the tower bar 10 in the extending direction than the fastening portions 161 are formed into cylindrical shapes as non-collapsed portions without being compressively deformed in the vehicle up-down direction. In particular, as illustrated in FIG. 3 to FIG. 5, in the bar vehicle-width center portion 16 extending in the vehicle width direction, a portion 162 between the two fastening portions 161 also maintains a tubular shape while the closed cross-sectional space 10*s* provided in the internal portion is not crushed.

Accordingly, the non-collapsed portions in the extending direction of the tower bar 10 other than the flatly formed fastening portions 161, the non-collapsed portions including the portion 162 between the two fastening portions 161 of the bar vehicle-width center portion 16, maintain higher bending rigidity than the two collapsed fastening portions 161.

Further, as described above, the guide reinforcement member 45 is disposed so as to continuously extend along the extending direction throughout the fastening portions 161 and the non-collapsed portions (including the non-collapsed portion provided in the portion 162 between the two fastening portions 161) in the extending direction of the tower bar 10 and so as to guide the tower bar 10.

As described above, the fastening portions 161 and the non-collapsed portions in the extending direction of the tower bar 10 are connected together in the extending direction by the guide reinforcement members 45, and strength of the fastening portions 161 formed into flat shapes is thereby secured by using strength of the non-collapsed portions.

Further, as illustrated in FIG. 5 and FIG. 6, on a rear portion side (base portion side) of the front extending portion 52 of the bracket 50, a step portion 53 in a stepped shape in the vehicle up-down direction is formed along the vehicle width direction such that a front side section (tip end side) of the front extending portion 52 is positioned below the flange portion 51.

The step portion 53 is formed throughout a whole length of the bracket 50 in the vehicle width direction. In the bracket 50, ridges 54*u* and 54*d* extending in the vehicle width direction are respectively formed at upper and lower ends of the step portion 53 by formation of this step portion 53 (the upper end ridge 54*u* at the upper end of the step portion 53 and the lower end ridge 54*d* at the lower end of the step portion 53).

Here, to a front side of the step portion 53 in the front extending portion 52 of the bracket 50, as described above, the bar vehicle-width center portion 16 is fixed from an upper area. Further, as illustrated in FIG. 2 and FIG. 4 to FIG. 7, the front vehicle-body structure for a vehicle of this embodiment is provided with a gate-shaped reinforcement member 60 as a reinforcement member reinforcing, from a lower area, a region 55 (hereinafter referred to as "bar fixing region 55"), to which the tower bar 10 is fixed from an upper area, in the front extending portion 52 of the bracket 50.

As illustrated in FIG. 2 and FIG. 4 to FIG. 7, the gate-shaped reinforcement member 60 is formed into a gate shape opening downward in a vehicle front view with a vehicle-width-direction extending member 61 horizontally extending in the vehicle width direction and a pair of left and right vehicle up-down direction extending members 62 generally vertically extending downward from left and right ends of the vehicle-width-direction extending portion.

As illustrated in FIG. 4 to FIG. 7, the vehicle-width-direction extending member 61 is disposed below the cowl lower panel 21 across, in the vehicle front-rear direction, the cowl 2 provided to jut out to the vehicle front area of the dash panel body 31 above the dash panel 3.

Further, as illustrated in FIG. 5 to FIG. 7, a front-side flange 63 formed at a front end of the vehicle-width-direction extending member 61 is joined, from a lower area, to the bar fixing region 55 (that is, a front side portion) of the front extending portion 52 of the bracket 50 positioned in front of the cowl lower panel 21.

Meanwhile, a rear-side flange 64 formed at a back end of the vehicle-width-direction extending member 61 is joined, from a front area, to an upper portion of the dash panel body 31 in a vertical wall shape, the upper portion being positioned below the cowl lower panel 21.

Accordingly, as illustrated in FIG. 4 to FIG. 6, the vehicle-width-direction extending member 61 forms a closed cross-sectional space 61*s* extending in the vehicle width direction among the bracket 50, the cowl lower panel 21, and the dash panel 3.

Here, as illustrated in FIG. 5 and FIG. 6, as described above, the front-side flange 63 of the vehicle-width-direction extending member 61 is joined, from a lower area, to the bar fixing region 55 of the front extending portion 52 of the bracket 50. This joining position (the position of the front-side flange 63 in FIG. 5) and the position of the step portion 53 (that is, the upper end ridge 54*u* and the lower end ridge 54*d*) provided on a base end side of the bracket 50 are formed to be offset (differently positioned) in the vehicle front-rear direction.

That is, the vehicle-width-direction extending member 61 is disposed below the step portion 53 so as to be across, in the vehicle front-rear direction, the step portion 53 (that is, the upper end ridge 54*u* and the lower end ridge 54*d*) provided on the base end side of the bracket 50 and so as to have the above-described closed cross-sectional space 61*s* extending in the vehicle width direction immediately below the step portion 53.

In addition, as illustrated in FIG. 6 and FIG. 7, in the above-described two bar fastening positions P16, the fastening portions 161 of the bar vehicle-width center portion 16 of the tower bar 10, the bottom surface portion 28 of the guide reinforcement member 45, the bar fixing region 55 of the front extending portion of the bracket 50, and in addition, the front-side flange 63 of the vehicle-width-direction extending member 61 are fastened and fixed by the above-described bolts and nuts.

Further, as illustrated in FIG. 2 and FIG. 4, the left and right vehicle up-down direction extending members 62 extend in the vehicle up-down direction so as to couple both ends of the vehicle-width-direction extending member 61 which respectively correspond to the left and right vehicle up-down direction extending members 62 with both ends of the gate-shaped portion 4*a* in the dash cross member 4 which respectively correspond to the left and right vehicle up-down direction extending members 62.

As illustrated in FIG. 2, the left and right vehicle up-down direction extending members 62 are provided in parts which in the vehicle width direction, agree with the node disposing positions P40 respectively corresponding to the left and right vehicle up-down direction extending members 62. In this embodiment, both of the left and right vehicle up-down direction extending members 62 extend generally in parallel with the vehicle up-down direction in a vehicle front view.

The left and right vehicle up-down direction extending members 62 extend downward from a rear portion of the vehicle-width-direction extending member 61 extending in the vehicle front-rear direction below the cowl 2 and form a closed cross-sectional spaces 62*s* extending in the vehicle up-down direction between the vehicle up-down direction extending members 62 and a front surface of the dash panel body 31 as illustrated in FIG. 7.

That is, the closed cross-sectional space 61*s* (see FIG. 5 and FIG. 6) of the vehicle-width-direction extending member 61, the respective closed cross-sectional spaces 62*s* (see FIG. 7) of the pair of left and right vehicle up-down direction extending members 62, and their joined portions together continuously extend.

As illustrated in FIG. 1 to FIG. 5, the above-described front vehicle-body structure for a vehicle of this embodiment is a front vehicle-body structure having: the front windshield 6 (see FIG. 5) being fixed to the edge portion of the opening 14 formed in the vehicle body; the pair of left and right front suspension housings 91; the cowl 2 forming a lower edge of the opening 14 for the front windshield 6; and the tower bar 10 coupling each of the left and right front suspension housings 91 with a region around the vehicle-width-direction center portion of the cowl 2. As illustrated in FIG. 1 to FIG. 3, the node members 40 as the rigidity improvement members each of which locally improves (bending) rigidity of the cowl 2 are disposed in two positions (that is, the node disposing positions P40) in the cowl 2, the two positions dividing the bonding surface 24*a* to the windshield lower edge 6*a* into generally three equal parts in the vehicle width direction. As illustrated in FIG. 3, the tower bar 10 is fixed to the positions corresponding to portions between the respective positions of the two node members 40 in the vehicle width direction of the cowl 2.

The above configuration can adjust balance of third-order vibration and can as a result improve NVH performance in the vehicle cabin. That is, vibration (130 to 140 Hz) of an engine can be inhibited from being transmitted as uncomfortable sound (muffled sound) sensed by an occupant into the vehicle cabin.

Work and effects of a vehicle-body front structure of this embodiment will be described in detail by using FIG. 8A, FIG. 8B, FIG. 9A, and FIG. 9B. All of FIG. 8A, FIG. 8B, FIG. 9A, and FIG. 9B illustrate a third-order vibration mode occurring to the front windshield 6 due to transmission of vibration (130 to 140 Hz) of the engine to the front windshield 6.

Figure 8A:
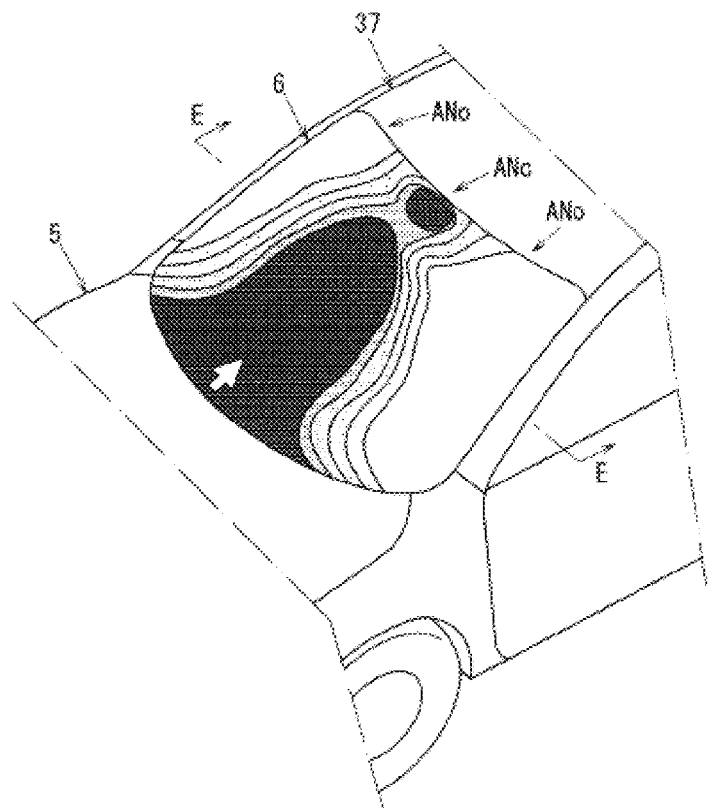
FIGS. 8A and 8B are explanatory diagrams explaining a third-order vibration mode of a front windshield of this embodiment.
Figure 8B:
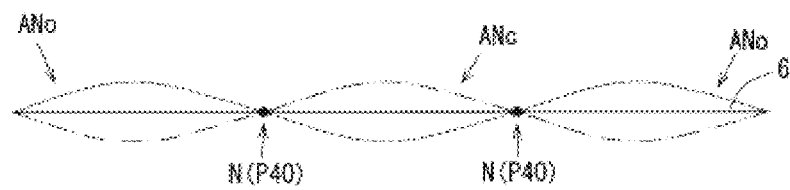
Figure 9A:
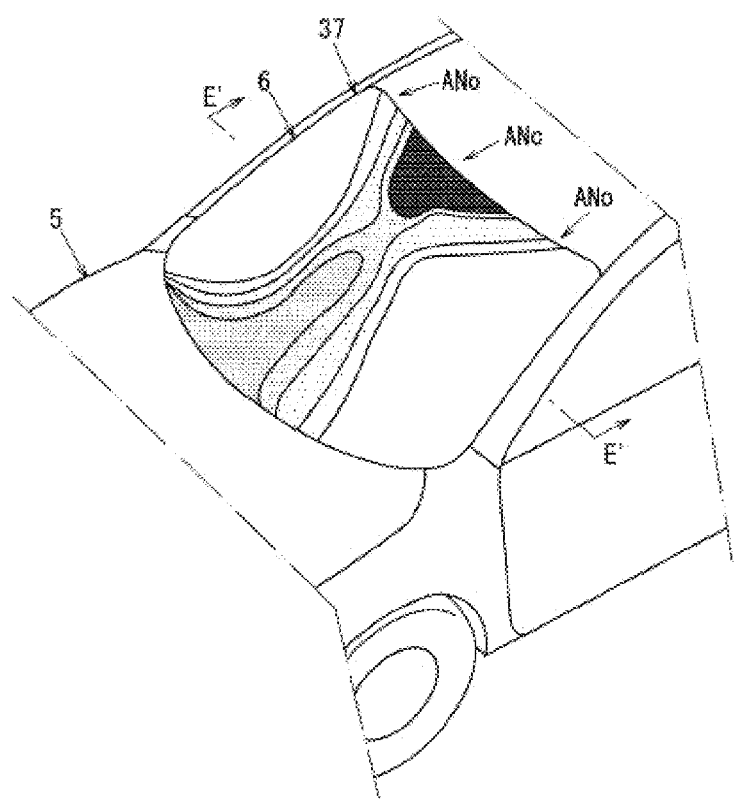
FIGS. 9A and 9B are explanatory diagrams explaining a third-order vibration mode of a front windshield of a related art example.
Figure 9B:
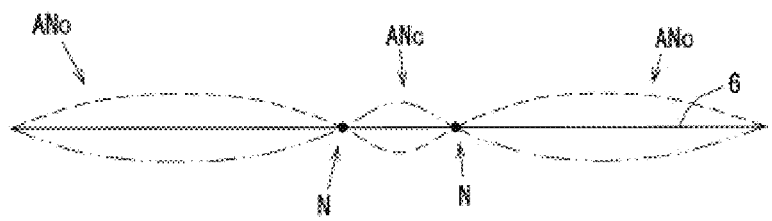

Specifically, FIG. 8A is an explanatory diagram illustrating the third-order vibration mode of a front windshield in the vehicle-body front structure of this embodiment, and FIG. 8B is a cross-sectional view schematically illustrating a cut portion along the vehicle width direction at the height of line E-E in FIG. 8A in the front windshield and is an explanatory diagram of the third-order vibration mode in the vehicle-body front structure of this embodiment. FIG. 9A is an explanatory diagram explaining a third-order vibration mode of a front windshield in a vehicle-body front structure in related art. FIG. 9B is a cross-sectional view schematically illustrating a cut portion along the vehicle width direction at the height of line E'-E' in FIG. 9A in the front windshield (corresponding to the same height of line E-E in FIG. 8A) and is an explanatory diagram of the third-order vibration mode in the vehicle-body front structure in related art.

Note that for convenience of illustration, FIG. 8A and FIG. 9A illustrate differences in a front windshield vibration level by the magnitude (denseness) of dot density.

In general, vibration of the engine in vehicle traveling is transmitted to the front windshield 6, and third-order vibration may thereby occur to the front windshield 6. Further, in a case where no measure is taken as in the vehicle-body front structure in related art, as illustrated in FIG. 9A and FIG. 9B, third-order vibration occurring to the front windshield 6 often becomes imbalance third-order vibration in which an amplitude of an antinode ANc produced in a center portion in the vehicle width direction is smaller than amplitudes of antinodes ANo produced on both sides.

On the other hand, the front vehicle-body structure for a vehicle of this embodiment is configured such that as described above, the tower bar 10 is fixed to the positions corresponding to the portions between the respective positions of the two node members 40 in the vehicle width direction of the cowl 2, and vibration of the engine in vehicle traveling is thereby input, via the tower bar 10, to a position close to the center antinode ANc of third-order vibration occurring to the front windshield 6 in the vehicle width direction of the cowl 2 (see the white arrow in FIG. 8A).

As described above, in this embodiment, in order to obtain balance of the amplitudes among the antinodes of third-order vibration occurring to the front windshield 6, that is, in order to enlarge the amplitude of the antinode ANc positioned at the center in the vehicle width direction, the antinode ANc being likely to have a small amplitude compared to the antinodes ANo on the both sides, a structure is employed in which vibration is intentionally input (vibration is applied) to the front windshield 6 from the bar vehicle-width center portion 16 of the tower bar 10 via the cowl 2.

Accordingly, even in a case where imbalance third-order vibration (for example, as illustrated in FIG. 9A and FIG. 9B, third-order vibration in which the amplitude of the antinode ANc at the center is smaller than the antinodes ANo on the both sides) occurs to the front windshield 6, as illustrated in FIG. 8A and FIG. 8B, amplitude differences among the antinodes ANo and ANc of the third-order vibration can be made small.

In particular, the height of the front windshield 6 in a cross-section, the height being indicated by line E-E in FIG. 8A and line E'-E' in FIG. 9A, is close to the height of the ears of the occupant in the vehicle cabin. Because in such a region, the amplitudes of the front windshield 6 illustrated in FIG. 8B can be realized, vibration producing sound at 130 to 140 Hz uncomfortable for the occupant is canceled.

In addition, because both of the two positions (that is, the node disposing positions P40) dividing the bonding surface 24a to the windshield lower edge 6a into generally three equal parts in the vehicle width direction correspond to positions of nodes N in a case where balanced third-order vibration occurs to the front windshield 6, the node members 40 are disposed in those two positions, and as illustrated in FIG. 8B, adjustment can thereby be made such that the nodes N of third-order vibration are placed in those two positions.

Accordingly, balance of third-order vibration can be adjusted, and as a result, the NVH performance in the vehicle cabin can be improved.

As an aspect of this disclosure, as illustrated in FIG. 4 to FIG. 6, the cowl 2 has the closed cross-sectional space 2s (closed cross-section) extending in the vehicle width direction, and as illustrated in FIG. 1 to FIG. 3, the rigidity improvement members are the node members 40 locally provided in the closed cross-sectional space 2s in the vehicle width direction.

In the above configuration, the rigidity improvement members can be formed with a simple configuration obtained by providing the node members 40.

As an aspect of this disclosure, as illustrated in FIG. 2, FIG. 3, and FIG. 7, the vehicle up-down direction extending members 62 (closed cross-sectional members) forming the closed cross-sectional spaces 62s (closed cross-sections) (see FIG. 7) extending in the vehicle up-down direction between the vehicle up-down direction extending members 62 and the dash panel 3 extending downward from a lower portion of the cowl 2 are provided below the cowl 2, and as illustrated in FIG. 2, the vehicle up-down direction extending members 62 are provided in the node disposing positions P40 corresponding to the two positions in the vehicle width direction below the cowl 2.

In the above configuration, the vehicle up-down direction extending members 62 are provided in the positions corresponding to the two node disposing positions P40 in the vehicle width direction below the cowl 2, that is, in the positions corresponding to the positions of nodes of a balanced third-order vibration among third-order vibrations occurring to the front windshield 6, and thereby the nodes of the third-order vibration can more certainly be produced in aimed positions in the front windshield 6.

Figure 10:
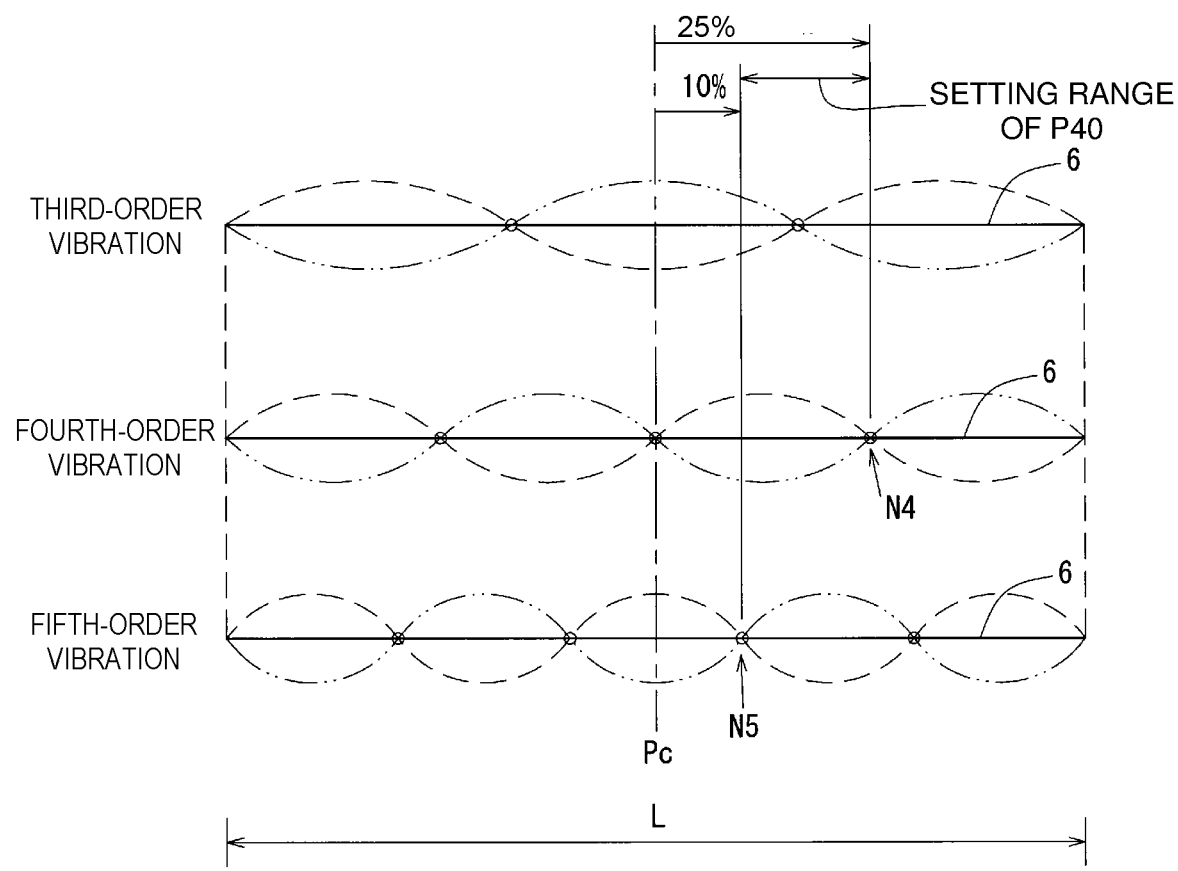
FIG. 10 is an explanatory diagram explaining a setting range of a node disposing position in the third-order vibration mode.

As an aspect of this disclosure, as illustrated in FIG. 1 and FIG. 10, the two node disposing positions P40 dividing the bonding surface 24a into generally three equal parts in the vehicle width direction are set in a range, from a middle position Pc of the bonding surface 24a in the vehicle width direction to each of left and right sides, between a vehicle-width-direction outer side of the position corresponding to 10% of a length L of the bonding surface 24a in the vehicle width direction and a vehicle-width-direction inner side of the position corresponding to 25% of the length L of the bonding surface 24a in the vehicle width direction. FIG. 10 is an explanatory diagram in a case of setting the range of the node disposing position in the third-order vibration mode in consideration of positions of nodes in a fourth-order vibration mode and a fifth-order vibration mode.

In the above configuration, as illustrated in FIG. 1 and FIG. 10, the two node disposing positions P40 dividing the bonding surface 24a into generally three equal parts in the vehicle width direction can be caused to fall in a range on the vehicle-width-direction outer side of the position of a node N5 of fifth-order vibration occurring to the front windshield 6 (the position corresponding to 10% of the length L of the bonding surface 24a in the vehicle width direction from the middle position Pc of the bonding surface 24a in the vehicle width direction to each of left and right sides).

Moreover, the two node disposing positions P40 dividing the bonding surface 24a into generally three equal parts in the vehicle width direction can be caused to fall in a range on the vehicle-width-direction inner side of the position of a node N4 of fourth-order vibration occurring to the front windshield 6 (the position corresponding to 25% of the length of the bonding surface 24a in the vehicle width direction from the middle position Pc of the bonding surface 24a in the vehicle width direction to each of left and right sides).

Accordingly, as described above, adjustment can be made by the node members 40 such that the nodes of third-order vibration occurring to the front windshield 6 are placed in positions of nodes of balanced third-order vibration.

This disclosure is not limited only to the configuration of the above-described embodiment but may be formed as various embodiments.

For example, a tower bar of the present disclosure is not limited to such a tower bar integrally formed throughout a portion between the left and right front suspension housings 91 in the vehicle width direction as the tower bar 10 of the above-described embodiment but may be formed with left and right separate members as long as a configuration is made such that front suspension housings are coupled with a vehicle-width-direction center portion of a cowl.

Further, the cowl 2 of this embodiment is configured to have the closed cross-sectional space 2s extending in the vehicle width direction; however, a cowl of the present disclosure is not limited to this configuration but may be configured such that an orthogonal cross-section to the vehicle width direction becomes an open cross-section.

What is claimed is:

1. A front vehicle-body structure for a vehicle, the front vehicle-body structure comprising:
a front windshield fixed to an edge portion of an opening in a vehicle body;
a pair of left and right front suspension housings;
a cowl defining a lower edge of the opening for the front windshield;
a tower bar coupling each of the left and right front suspension housings with a region around a vehicle-width-direction center portion of the cowl; and
a pair of node members, each of which locally improves bending rigidity of the cowl, disposed in two positions in the cowl, the two positions dividing a bonding surface to a lower edge of the front windshield into generally three equal parts in a vehicle width direction, and the tower bar being fixed to the cowl at positions corresponding to portions between respective positions of the pair of node members in the vehicle width direction of the cowl; wherein
closed cross-sectional members configuring closed cross-sections extending in a vehicle up-down direction between the closed cross-sectional members and a dash panel extending downward from a lower portion of the cowl are provided below the cowl, and the closed cross-sectional members are provided in positions corresponding to the two positions in the vehicle width direction below the cowl.

2. The front vehicle-body structure for a vehicle according to claim 1, wherein the cowl has a closed cross-section or an open cross-section extending in the vehicle width direction, and the pair of node members are locally provided in the closed cross-section or the open cross-section in the vehicle width direction.

3. The front vehicle-body structure for a vehicle according to claim 1, wherein the two positions dividing the bonding surface into generally three equal parts in the vehicle width direction are set in a range, with respect to a middle position of the bonding surface in the vehicle width direction, between a vehicle-width-direction outer side of a position corresponding to 10% of a length of the bonding surface in the vehicle width direction and a vehicle-width-direction inner side of a position corresponding to 25% of the length of the bonding surface in the vehicle width direction.

4. The front vehicle-body structure for a vehicle according to claim 2, wherein the two positions dividing the bonding surface into generally three equal parts in the vehicle width direction are set in a range, with respect to a middle position of the bonding surface in the vehicle width direction, between a vehicle-width-direction outer side of a position corresponding to 10% of a length of the bonding surface in the vehicle width direction and a vehicle-width-direction inner side of a position corresponding to 25% of the length of the bonding surface in the vehicle width direction.

5. The front vehicle-body structure for a vehicle according to claim 2, wherein each node member is integrally formed, such that an orthogonal cross-section to the vehicle front-rear direction becomes a hat-shaped profile, with a bottom face extending in the vehicle width direction, a pair of left and right side faces extending from both ends of the bottom face in the vehicle width direction to a vehicle upper area, and a pair of left and right upper end flange portions respectively extending in opposite directions in the vehicle width direction from upper ends of the pair of left and right side faces.

6. The front vehicle-body structure for a vehicle according to claim 5, wherein in each node member, the bottom face is joined to a bottom surface portion of a cowl lower panel of the cowl from an upper area of the cowl lower panel, and the left and right upper end flange portions are joined to a first surface portion and a second surface portion of a cowl upper panel of the cowl from a lower area of the cowl upper panel.

\* \* \* \* \*